Figure 1:
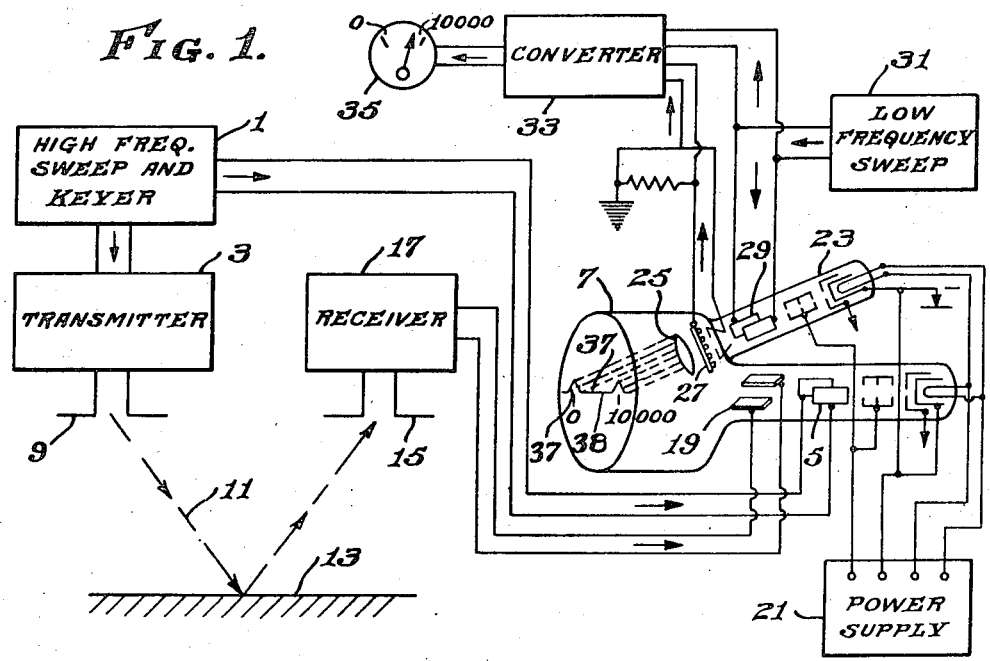

Inventor
Rogers M. Smith
Attorney

Oct. 12, 1948.　　　　　R. M. SMITH　　　　　2,451,000
REPEATER INDICATOR FOR PULSE ECHO
DISTANCE MEASURING DEVICES
Filed Nov. 30, 1940　　　　　　　　　　　　2 Sheets-Sheet 2
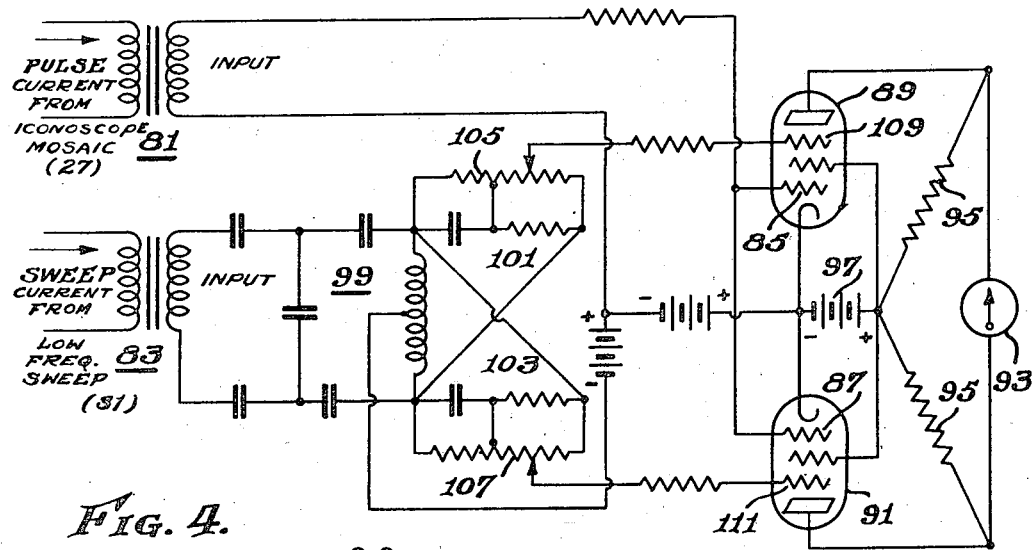
Fig. 3.
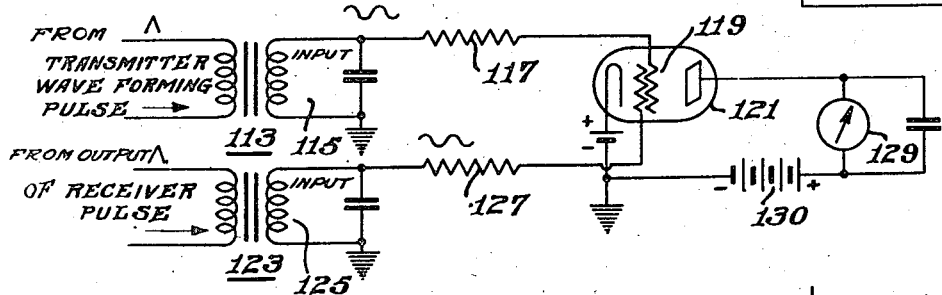
Fig. 4.
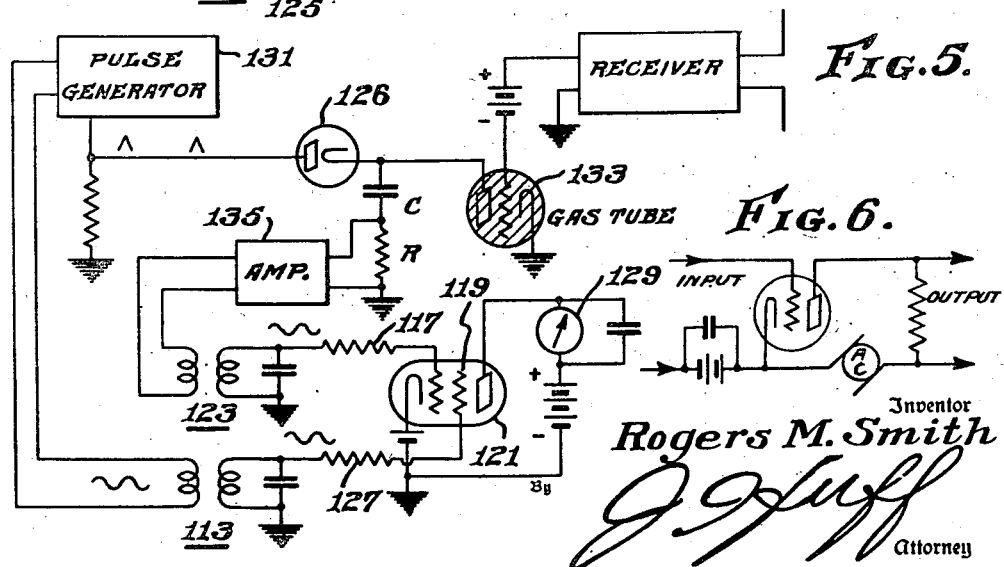
Fig. 5.
Fig. 6.
Inventor
Rogers M. Smith
By J. J. Huff
Attorney Patented Oct. 12, 1948

2,451,000

UNITED STATES PATENT OFFICE 2,451,000

REPEATER INDICATOR FOR PULSE ECHO DISTANCE MEASURING DEVICES

Rogers M. Smith, Merchantville, N. J., assignor to Radio Corporation of America, a corporation of Delaware Application November 30, 1940, Serial No. 367,909

12 Claims. (Cl. 343—13)

This invention relates to a repeater mechanism for indicating at a remote point the distance from a radio pulse system to a wave reflecting medium.

Distances to a wave-reflecting medium may be measured by directing a pulse of radio frequency energy toward the medium and indicating the distance of the medium as a function of the time taken for the pulse to travel to and be reflected from the medium. One method of making a measurement by means of a pulse echo system is to abruptly key on and off a radio transmitter in synchronism with a timing sweep voltage which is applied to deflect the ray of a cathode ray tube. Thus, the cathode ray traces a path which is indicated on the fluorescent screen along one coordinate representing distance or time. A radio receiver is connected to the cathode ray tube which indicates the initial outgoing pulse, as well as the received radio echoes. These indications appear as ray deflections along a second coordinate.

If the pulse is extremely short, for example, of the order of $\frac{1}{10}$ of a microsecond, and if the sweep occurs at a rapid rate, very satisfactory indications are obtained from echoes which travel distances as short as 40 or 50 feet and as far as several miles. Indications of this type are most useful in the operation of aircraft. While it is often sufficient to provide one indicator for the craft navigator, it may be advantageous to indicate the closest wave-reflecting object at other points on the aircraft.

In view of the extremely high frequencies involved, it is very difficult to transmit the high frequency currents over any transmission lines of practical size without serious attenuation. Furthermore, while lower frequency currents may be obtained from other types of measuring systems, if a remote indicator is of the cathode ray type, substantial power supplies are required and the indicator tends to be bulky. It is, therefore, one of the objects of the present invention to provide means for indicating radio echo distance observations at points remote from the measuring device by means including a conventional D'Arsonval meter. It is another object of the invention to provide means for converting the high frequency currents of a cathode ray pulse echo distance system into currents of lower frequency whereby the low frequency currents may be readily transmitted to remote points. Another object is to provide means for indicating at remote points the shortest distance from a pulse echo device to a radio wave reflecting medium. Another object is to provide means for indicating accurately at a point remote from a pulse echo device the first echo of a plurality of echoes.

Figure 2:
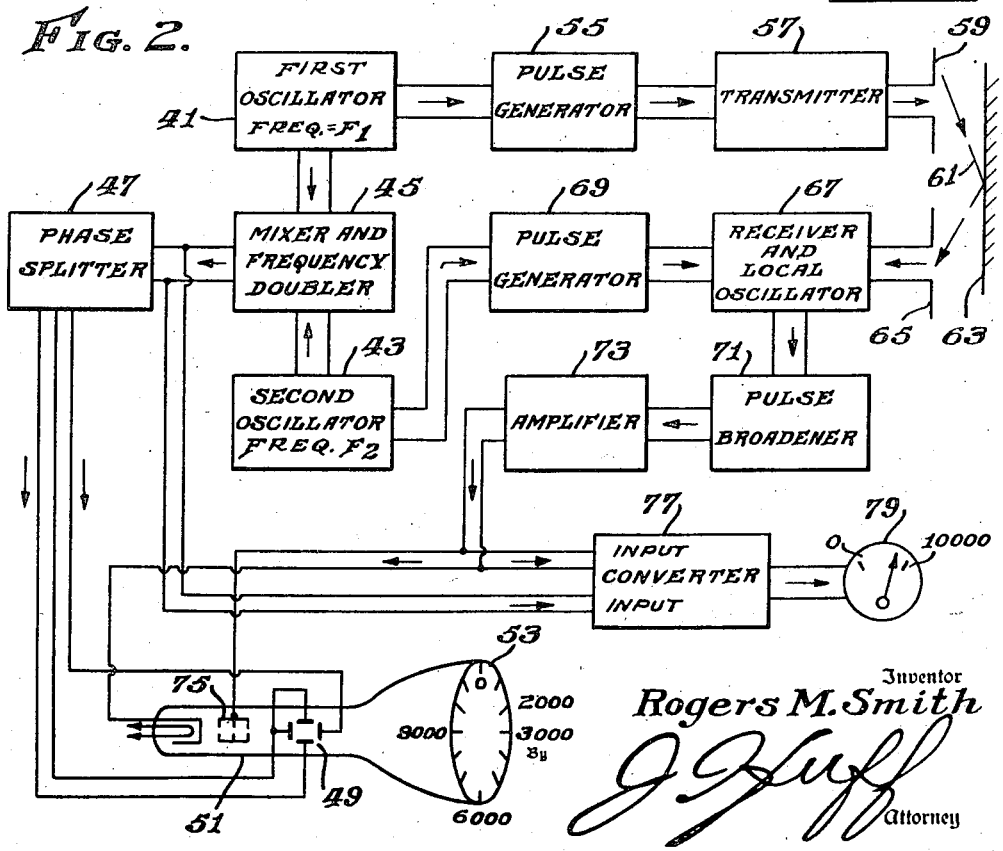

The invention will be described by reference to the accompanying drawings in which Figure 1 represents one embodiment of the invention; Figure 2 represents a modification of the invention; Figures 3, 4 and 5 represent in schematic diagram form remote indicators of the types employed in practicing the invention, and Figure 6 is a circuit diagram of a pulse broadener.

Referring to Figure 1, a source 1 of high frequency sweep and keyer voltages is connected to a transmitter 3 and to the horizontal deflecting electrodes 5 of a cathode ray tube 7. The transmitter includes a directive antenna 9 from which waves 11 are directed to the wave reflecting medium 13. The waves are reflected to a receiving antenna 15 which is connected to a receiver 17. The output of the receiver is applied to the vertical deflecting electrodes 19 of the cathode ray tube. The cathode ray tube is energized by a power supply 21. There is incorporated in front of or within the cathode ray tube a television pickup tube 23 including a lens 25 for focusing the cathode ray trace including the distance indications other than the initial or zero pulse on a mosaic, or storage screen 27. The pickup tube includes horizontal deflecting electrodes 29 which are connected to a low frequency sweep voltage source 31. The low frequency sweep source is also connected to a converter 33 which will be hereinafter described. The converter is connected to the output circuit of the pickup tube. The converter output is indicated on a movable element or D'Arsonval type meter 35. It should be understood that the pickup tube beam may be arranged to scan any other type of image storage screen other than the mosaic described heretofore. Also potentials may be derived, in any other well known manner, from the storage screen, and applied to the converter.

The operation of the device illustrated in Fig. 1 is essentially as follows: At the start of the high frequency sweep a keying impulse is applied to the transmitter. At the same time the cathode ray of the cathode ray tube is swept from the zero indication toward the maximum which, for example, may be 10,000 feet. The outgoing radio pulse travels until it strikes the reflecting medium 13 and thereupon is returned at least in part to the receiver 17. The pulse is applied to the vertical deflecting plate 19 to produce an indication 37 on the cathode ray tube. This indication corresponds to the distance from the pulse echo system to the reflecting medium. The pulses are generally transmitted at a high rate, for example, 20,000 per second. It should be understood that the pulse duration is generally of the order of one-fiftieth part of the time between pulses. The persistence of the fluorescent screen makes the trace 38 appear steady notwithstanding the fact that the received pulses actually vary not only at the rate of the transmitter but also due to the nature of the reflecting medium.

In any event an image of the cathode ray trace 37, 38 is focused by means of the lens 25 on the mosaic, or storage screen 27. The mosaic is scanned by the application of low frequency sweep voltages derived from the source 31 to the deflecting electrodes 29. The potentials of the low frequency sweep, which may be sinusoidal or saw-tooth wave form, are applied to a converter 33. Potentials derived from the mosaic 27 and corresponding to the received echo are also applied to the converter. If the phase of the potential corresponding to the received echo pulse is compared with either the potential corresponding to the initial pulse or with the low frequency sweep potential, distance may be indicated. With this type of indicator a plurality of echoes, which are separately visible or grouped on the cathode ray screen, will be integrated because a single pulse of potential will be derived from the mosaic and hence indicated as a single reading. If the converter selects the average or the mean of a plurality of echo pulses the distance indicated will correspond to mean distance rather than the nearest part of the reflecting medium. For aircraft operation, it is generally desirable to indicate the nearest wave reflecting object. The type of indication will, of course, depend upon the nature of the converter which will be hereinafter described.

Another type of distance measuring device is indicated in Fig. 2. In this arrangement a pair of oscillators 41, 43, generating currents of different frequency F1 and F2, are connected to a mixer and frequency doubler 45. The currents of twice the difference frequency are applied to a phase splitter 47 and hence to the deflecting electrodes 49 of a cathode ray tube 51. The currents from the phase splitter cause the cathode ray to rotate around the scale 53 at a comparatively low angular frequency.

The first oscillator 41 is connected to a pulse generator 55 which is connected to the transmitter 57. The output of the transmitter is applied to a directive antenna 59 from which pulses of energy 61 are directed toward the wave reflecting medium 63. The echo pulses are applied to the antenna 65 of a receiver 67 which includes a local oscillator.

The second oscillator 43 is connected through a second pulse generator 69 to the receiver 67. The output of the receiver is applied to a pulse broadener 71 and hence to an amplifier 73. The pulse broadener 71 may consist of a thermionic tube whose output circuit includes an A.-C. source for energizing the tube and a resistor connected between the source and the anode. The output voltages are obtained across the resistor, as shown in Fig. 6. The output of the amplifier is applied to a control electrode 75 in the cathode ray tube 51. In the present arrangement the currents from the frequency doubler 45 and the amplifier 73 are applied to the converter 77 whose output is indicated on the meter 79. A detailed description of the operation of the circuit of Fig. 2 will be found in the copending application Serial No. 196,863, filed March 19, 1938, by Irving Wolff, now Patent No. 2,407,198, issued September 3, 1946, and entitled "Distance and directional determining system." The pulse broadener, which is also shown in the allowed copending Wolff application, consists of a thermionic tube whose input consists of the conventional grid-cathode connections and whose output consists of a resistor serially connecting an alternating current source between the cathode and anode. The output is derived across the resistor. For the purpose of the present application it is sufficient to say that the first oscillator 41 determines the pulse frequency or rate at which pulses are radiated. The second oscillator 43 determines the rate at which the receiver is keyed on and off. Since these rates are different and since the cathode ray is rotated at twice the difference of the rates and in synchronism with the pulse radiation, it follows that the received signals will be indicated on the cathode ray tube screen 53 only at the times when the reflected pulses reach the receiver at the instant the receiver is keyed on. Moreover, these indications are so related to the rotating ray that the distances of the reflecting objects may be indicated by calibrating the cathode ray tube as shown.

It should be understood that the sweep frequency voltage occurs at a relatively low angular frequency and the received broadened pulse is of comparatively long duration. It is, therefore, not necessary to convert currents of these frequencies into currents of lower frequency. The currents may be applied directly to the converter 77 which may be located either at the remote station along with the meter 79 or the two devices may be separated.

Several different forms of converters may be used. One such converter is shown in Fig. 3 in which pulses representing currents from the television pickup tube are applied to the first transformer 81. The low frequency sweep currents are applied to a second transformer 83. The output from the first transformer is applied in parallel to grid electrodes 85, 87 of a pair of thermionic tubes 89, 91. The anodes of these tubes are connected together by a meter 93. The anodes are also connected through resistors 95 to the positive terminal of a B battery 97.

The output of the second transformer may include a filter circuit 99 whose function is to eliminate currents of any undesired frequency. The filter is connected to a pair of phase splitting circuits 101, 103. Potentiometers 105, 107 are connected respectively across the phase splitting circuits. The sliders of the potentiometers are connected respectively to control grids 109, 111. In this arrangement the sweep potentials are applied to the thermionic tube inputs in pushpull while the pulse potentials are applied in parallel whereby the output meter indicates the phase of the pulse with reference to the sweep potential. If the foregoing converter is used in connection with Fig. 1 it is desirable to adjust the pickup tube sweep so that it does not include the initial pulse. The inclusion of the initial pulse is undesirable because it diminishes the accuracy of the indicator and further tends to average the readings inasmuch as this type of indicator cannot distinguish between the echo pulses and the initial pulse. The persistence of the cathode ray trace tends to make the average readings consistent and to eliminate the effects of variations in the received echo.

Fig. 4 is a diagram of another type of converter which may be used in conjunction with either the circuit of Fig. 1 or the circuit of Fig. 2. A transformer 113 is arranged so that the transmitter pulses or the alternating currents from which the pulses are derived are applied to the primary and hence to the secondary which includes a low resistance tuned circuit 115. This circuit is connected through a grid current limiting resistor 117 to one of a pair of coplanar grids 119 of a thermionic tube 121. A second transformer 123, which is made as nearly like the first transformer as possible, has its primary connected to the receiver circuit and has its secondary 125 connected through a grid current limiting resistor 127 to the other of the coplanar grids 119. The anode circuit of the tube 121 is connected through a meter 129 to the positive terminal of a B battery 131. In this arrangement the low decrement of the oscillatory circuits 115 and 125 corresponds to the persistence of the fluorescent and mosaic screens when the pickup tube is used. The pulses are applied to the oscillatory circuits, causing oscillatory currents to be established in the tuned circuits. The subsequently applied pulses tend to only slightly change the phase of the initial oscillations. The phases of the oscillatory currents are indicated in the meter 129 which may be calibrated to indicate the distance of the nearest reflecting medium or the average distance.

While either of the foregoing converters may be used they will not necessarily provide an indication of the distance of the nearest wave reflecting object but instead may indicate a mean or average distance. A more accurate indication may be obtained by the circuit arrangement of Fig. 5, in which a rectifier 126 is connected to the pulse generator 131. The rectifier cathode is connected to the anode of a gaseous discharge tube 133. The grid of the gas tube is connected through a suitable biasing battery to the receiver output circuit. The anode of the gas tube is also connected to ground through a capacitor C and resistor R. The value of the capacitor is chosen so that it is charged to a predetermined potential by the rectified pulses. The value of the resistor is preferably chosen so that the discharge time of the anode circuit, capacitor, and resistor is of the same order as the time between the initial pulse and reflection from the shortest distance to be measured. The discharge currents may be amplified by an amplifier 135 and thereafter applied to the primary of the transformer 123 (see Fig. 2). The primary of the other transformer 113 is connected to that portion of the pulse generator or keyer which includes a sinusoidal wave; although other wave forms may be used.

In this arrangement, which may be added to the circuit of either Fig. 4 (as shown) or Fig. 3, the transmitter pulse is rectified and the rectified pulse charges the capacitor C. The capacitor remains charged because the gas tube is initially blocked and no other discharge path is offered. The incoming pulse ignites the gas in the tube which suddenly and substantially completely discharges the capacitor C. The tube 133 remains ignited, and since the capacitor is discharged, subsequent received echo pulses have no effect. The next transmitter pulse will restore the tube to an operable condition for the first incoming echo pulse. Thus only the first echo pulse operates the device and the remote meter 129 indicates only the nearest reflecting body. It should be understood that a relaxation type of tube circuit may be substituted for the gaseous discharge tube, or any device which serves a similar function may be employed.

Thus the invention has been described as a remote indicator for a radio pulse echo distance measuring system. The pulse echo system employs a high frequency sweep and a rapid pulse. Since it is not practical to transmit over conventional lines either the high frequency sweep or the rapid pulse, these components are reestablished, by means of a television pickup tube, as low frequency currents which are easily transmitted to a remote point. The remote indicator operates in synchronism with the low frequency currents and includes a moving coil which responds to the echo signals for indicating the distance of the reflecting object.

I claim as my invention:

1. A repeater for a pulse transmitting-pulse echo receiving distance measuring device for repeating at a remote point the visual indications of such device including means responsive to the received echo signal for deriving a current corresponding to the echo, means responsive to the outgoing pulses for deriving a reference current, said corresponding current and said reference current both having a frequency lower than the pulse transmission rate, and means including a moving element for indicating the distance as a function of the relative phase of said currents.

2. A repeater for a pulse transmitting-pulse echo receiving distance measuring device for repeating at a remote point the visual indications of such device including means persistently responsive to the received echo signal for deriving a current having a phase dependent upon said echo signal and having a frequency lower than the repetition rate of the echo signal, means persistently responsive to the transmitted pulse for deriving a current having a phase dependent upon said transmitted pulse and having a frequency lower than the repetition rate of the transmitted pulses, and means including a moving coil type of meter for indicating at a remote point the phase of the current corresponding to said received echo with reference to the phase of the current corresponding to said transmitted pulse.

3. A repeater of the character of claim 2 in which at least one of said persistently responsive means includes a resonant circuit.

4. A repeater for a pulse transmitting-pulse echo receiving system including a pair of tuned circuits, means for applying the transmitted pulse to one of said tuned circuits for converting said pulse to a current of substantially sinusoidal wave form, means for applying the received echo pulse to the other of said tuned circuits for converting said echo pulse to a current of substantially sinusoidal wave form, and means including a moving coil instrument responsive to the currents established by the application of said pulses to said circuits for indicating their relative phases.

5. A repeater for a pulse echo distance system in which a transmitted pulse is selected as a function of an alternating current and the time phase of the received echo pulse varies as the distance to the reflected object and from the reflecting object to the receiver, including a pair of resonant circuits, means for applying said alternating current to one of said resonant circuits to obtain a current of reference phase, means for applying said received echo pulse to the other of said tuned circuits to convert said echo pulse into a substantially sinusoidal current having a phase dependent upon said distance, and means including a moving coil meter for indicating at a remote point the phase of said current of dependent phase with reference to the current of reference phase.

6. A repeater for pulse transmitting-pulse echo receiving systems including means responsive to the transmitted pulse for deriving a current of reference phase and of a frequency lower than the repetition rate of the transmitted pulses, means responsive to the first received echo pulse only for deriving a current of variable phase and of a frequency lower than the repetition rate of the transmitted pulses, and means including a moving coil meter for indicating the phase of said current of variable phase with reference to said current of reference phase at a point remote from said system.

7. A repeater for a pulse transmitting-pulse echo receiving system including means persistently responsive to the received echo pulse for deriving a current having a phase dependent upon distance and of a frequency lower than said pulse transmitting rate and substantially independent of irregularities in the echo, means for deriving from said system a current of reference phase and of a frequency lower than said pulse transmitting rate, and means including a moving coil meter for determining at a remote point the phase of said current derived from the received echo pulse.

8. A repeater for a pulse transmitting-pulse echo receiving distance measuring device for repeating at a remote point the visual indications of such device in which the distance of an object is indicated as a cathode ray trace variation on a mosaic, means for establishing a current of reference phase, means for applying said reference current to scan said mosaic to derive therefrom a current having a phase corresponding to said distance, and means for indicating at a remote point the phase of said derived current with respect to said reference phase.

9. A repeater for a pulse transmitting-pulse echo receiving system in which the received echo pulses are indicated as variations of a cathode ray on a fluorescent screen including means for generating a low frequency current, means for forming an image of said screen, a photoelectric surface for establishing electric charges corresponding to said image, means connected to said generator for sweeping said photoelectric surface at a low frequency rate to obtain pulses of current corresponding to said variations, and means connected to said generating means and to said current-obtaining means and including a movable element for indicating at a remote point the phase of said pulses of current with respect to the phase of currents from said low frequency generating means.

10. A repeater for a pulse transmitting-pulse echo receiving distance measuring device for repeating at a remote point the visual indications of such device in which the distance of an object is indicated as a cathode ray trace variation on a storage screen, means for establishing a current of reference phase, means for applying said reference current to scan said storage screen to derive therefrom a current having a phase corresponding to said distance, and means for indicating at a remote point the phase of said derived current with respect to said reference phase.

11. A distance-indicating device, including: a transmitter for transmitting toward an object, the distance of which is to be measured, a steep front electromagnetic wave train consisting of only a few ultra high frequency cycles for reflection back from the object; means for receiving the reflection of said wave train from such object; means for producing a cathode-ray beam; means for causing said cathode-ray beam to sweep along a defined path, said causing means being responsive to the transmission of said wave train by said transmitter; means for causing interruption of the sweep of said beam along said defined path in response to receipt of the reflected wave train by said receiving means; an electric circuit providing for flow of electric current therein; means for varying the flow of current in said electric circuit in accord with the duration of said sweep along said defined path; and means in said circuit responsive to said variations in the flow of current in the circuit.

12. A repeater device for a pulse echo distance system for repeating at a remote point the visual indications of such device in which means are included for transmitting a pulse of wave energy, means for receiving said pulse energy after reflection from a plurality of objects whose distances are to be determined, means for indicating said distances as functions of the respective propagation times of said wave energy, means responsive to said transmitted pulse for deriving a current corresponding to the outgoing pulse, means responsive to the first of the received reflected pulses for deriving a current corresponding to said first received reflected pulse, and means including a meter with a movable coil and pointer for indicating at a remote point the distance of the nearest of said objects as a function of the relative phase of said currents.

ROGERS M. SMITH.

REFERENCES CITED

The following references are of record in the file of this patent:

UNITED STATES PATENTS

| Number | Name | Date |
|---|---|---|
| 1,660,886 | Randall | Feb. 28, 1928 |
| 1,945,952 | Nicolson | Feb. 6, 1934 |
| 2,012,480 | Reich | Aug. 27, 1935 |
| 2,055,883 | Terry | Sept. 29, 1936 |
| 2,172,395 | McSpadden | Sept. 12, 1939 |
| 2,189,582 | Hineline | Feb. 6, 1940 |
| 2,225,348 | Mikelson | Dec. 17, 1940 |
| 2,227,598 | Lyman et al | Jan. 7, 1941 |
| 2,333,688 | Shepard, Jr. | Nov. 9, 1943 |
| 2,404,257 | Potapenko | July 23, 1946 |
| 2,406,371 | Hansen et al | Aug. 27, 1946 |